United States Patent [19]

Ersun-Hallsby et al.

[11] Patent Number: 5,204,386
[45] Date of Patent: Apr. 20, 1993

[54] ACRYLIC-MODIFIED EPOXY RESIN ADHESIVE COMPOSITIONS WITH IMPROVED RHEOLOGICAL CONTROL

[75] Inventors: Yasemin Ersun-Hallsby; Dwight K. Hoffman, both of Midland; Gerald C. Kolb, Bay City; Gene D. Rose, Midland, all of Mich.

[73] Assignee: The Dow Chemical Company, Midland, Mich.

[21] Appl. No.: 896,730

[22] Filed: Jun. 9, 1992

Related U.S. Application Data

[63] Continuation-in-part of Ser. No. 611,806, Nov. 13, 1990, abandoned.

[51] Int. Cl.$^5$ .................. C08L 63/00; C08F 283/00
[52] U.S. Cl. .................. 523/443; 525/531; 525/529; 525/112; 525/922
[58] Field of Search ............... 525/531, 529, 922, 112; 523/443

[56] References Cited

U.S. PATENT DOCUMENTS

| | | |
|---|---|---|
| 4,098,841 | 7/1978 | Nagata et al. . |
| 4,221,697 | 9/1980 | Osborn et al. . |
| 4,221,892 | 9/1980 | Baron et al. . |
| 4,357,432 | 11/1982 | Edwards .............................. 523/351 |
| 4,383,060 | 5/1983 | Dearlove et al. ................... 523/443 |
| 4,443,568 | 4/1984 | Woo . |
| 4,444,923 | 4/1984 | McCarty . |
| 4,455,331 | 6/1984 | Barsotti ............................. 524/492 |
| 4,482,671 | 11/1984 | Woo et al. . |
| 4,521,490 | 6/1985 | Pocius et al. . |
| 4,522,958 | 6/1985 | Das et al. ........................... 523/220 |
| 4,524,181 | 6/1985 | Adam et al. . |
| 4,565,853 | 1/1986 | Herscovici et al. . |
| 4,579,887 | 4/1986 | Mizusawa et al. . |
| 4,661,539 | 4/1987 | Goel .................................. 523/443 |
| 4,668,736 | 5/1987 | Robins et al. . |
| 4,704,331 | 11/1987 | Robins et al. . |
| 4,708,996 | 11/1987 | Hoffman et al. . |
| 4,789,712 | 12/1988 | Hoffman et al. . |
| 4,847,122 | 7/1989 | Goldberg et al. ................. 523/443 |
| 5,096,963 | 3/1992 | Blain ................................. 524/765 |

*Primary Examiner*—Melvyn I. Marquis
*Assistant Examiner*—Randy Galakowski

[57] ABSTRACT

A thixoropic adhesive composition exhibiing good sag resistance is prepared comprising a mixture of a polymer-modified epoxy resin and a rheological control agent. The polymer-modified epoxy resin is preferably a dispersion of acrylic elastomer in an epoxy resin in which the acrylic elastomer particles have added hydroxyl functionality which interacts favorably with rheological control agents, such as fumed silica. Acrylic epoxy resin dispersions containing added hydroxyl functionality give improved rheological control.

12 Claims, No Drawings

ACRYLIC-MODIFIED EPOXY RESIN ADHESIVE COMPOSITIONS WITH IMPROVED RHEOLOGICAL CONTROL

CROSS-REFERENCE TO RELATED APPLICATION

This is a continuation-in-part of application Ser. No. 07/611,806, filed Nov. 13, 1990 now abandoned.

BACKGROUND OF THE INVENTION

This invention pertains to the use of epoxy resins in adhesive compositions with improved properties. The invention also provides for a physically stable dispersion which may be used in such adhesive compositions.

Epoxy resins have a spectrum of properties that are well adapted for use in coatings, adhesives, fiber-reinforced laminates, composites, engineering plastics and specialty applications, such as potting resins and mortars. Such properties include excellent strength, toughness, corrosion and solvent resistance, good adhesion and electrical properties, good dimensional stability, hardness, and low shrinkage on cure.

Adhesives are a particularly important application for epoxy resins. Epoxy-based adhesives offer many advantages to end-users such as high strength and moisture resistance while providing protective seals as well as load-bearing properties.

Generally, epoxy resins are formulated into either one- or two-component, ambient or heat-cured paste or film adhesives. Typical ingredients, in addition to the epoxy resin, include curing agents, catalysts and accelerators, fillers, pigments, reactive diluents, nonreactive diluents, solvents, flexibilizers, toughening agents, extenders and rheological control agents.

Good rheological control is important to an epoxy adhesive. It must thin under shear to allow for easy application and wetting of surfaces; however, once it has been applied slumping or sagging of the adhesive bead can be a problem. At the same time, separation of the formulation ingredients must be avoided.

Heretofore, adhesive formulations based upon epoxy resins, toughened with insoluble dispersions of acrylic elastomers, show poor rheological control. Epoxy resins toughened with reactive liquid polymers, such as carboxyl-terminated butadiene-acrylonitrile liquid polymers, also pose certain difficulties in formulating and handling.

First, resins in the prior art toughened with reactive liquid polymers need a fair amount of fumed silica to achieve good rheological control. High loading of fumed silica, usually more than 5 weight percent, is necessary to achieve good rheological control. High concentrations of fumed silica or other fillers may cause abrasion problems, alter polymer properties and lower the adhesive strength. Second, since these resins are highly viscous (500,000 to 900,000 centipoise (cps) at 25° C.), it is difficult to incorporate large amounts of fumed silica into them. Therefore, additional diluents and processing steps, such as a let-down procedure, are required for the formulation of such epoxy resins toughened with reactive liquid polymers.

Rheological control in paste-type adhesive systems is especially important in robotic dispensing applications. In automotive assembly lines the adhesive is dispensed with a robot and the part with uncured adhesive is transferred to other work stations for curing and further processing. Under these conditions it is imperative that the assembly line is not contaminated with drippings from uncured adhesive.

In a one-part epoxy adhesive, satisfactory rheological control for the uncured system requires ease of pumping and no stringing once the adhesive is dispensed and the robot is removed. Then, regardless of the type of surface (cold-rolled steel, hot-dipped galvanized, electrogalvanized, aluminum, etc.) and regardless of the cleanliness of the surface (solvent-wiped, oily, laser-treated, etc.) the adhesive needs to stay on the surface without sagging, drooping or dripping. Most commonly, one-part epoxy adhesives are cured at elevated temperatures. As the temperature of the adhesive is increased, resin viscosity will decrease and the wettability of the adhesive will increase. It is also important, however, that the adhesive does not sag or drip at elevated temperatures before cure takes place.

In a two-part paste adhesive system, sag control can be partially or completely achieved by room temperature cure. In this case, rheological control is achieved by rapid build-up of microstructure. If rheological control is primarily achieved by microstructure build-up at ambient conditions, a balance between cure rate and dispensing rate must be maintained.

In slow gelling two-part adhesives, until the right amount of microstructure build-up occurs, requirements for rheological control are similar to one-part adhesives. Again, handling, abrasiveness and loss of properties are valid concerns. In addition, long molecular chains, formed because of the ambient cure, will be a likely cause of stringing. In this case, depending on the viscosity of the system, some mechanical solutions can be offered. If the mechanical approach is not adequate or cannot be used, this invention offers solutions for two-part as well as for one-part adhesives.

Four U.S. patents describe the preparation of stable acrylic elastomer dispersions in epoxy resins for toughened epoxy resins: U.S. Pat. Nos. 4,521,490; 4,524,181; 4,708,996; and 4,789,712. While these patents describe a wide range of preferred vinyl monomers and comonomers, in particular the esters of acrylic or methacrylic acid with alkanols having 1 to 18 carbon atoms, the inclusion of hydroxy-functional comonomers for rheological control is not considered.

The formulation of acrylic dispersions into paste adhesives is described in U.S. Pat. No. 4,521,490. However, the question of rheological control is not addressed in this patent. In particular, the formulation of the dispersion with fumed silica and its rheology is not described.

SUMMARY OF THE INVENTION

This invention is a thixotropic adhesive composition exhibiting good sag resistance comprising a mixture of a polymer-modified epoxy resin and a rheological control agent. More precisely, the invention comprises a mixture of a dispersion which comprises an uncured epoxy resin as a continuous phase having dispersed therein an in situ polymerized insoluble acrylic elastomer which has a plurality of hydroxyl functionality and a rheological control agent which has a plurality of pendent hydroxyl groups, such as fumed silica. Acrylic epoxy resin dispersions containing added hydroxyl functionality give improved rheological control.

The invention is also a method of preparing an adhesive composition with superior rheological control and toughness at lower viscosities compared to existing oneor two-part toughened epoxy resin adhesives. In addition, the invention shows a method of adhering surfaces together using an epoxy resin based adhesive.

The method of preparing the adhesive composition comprises (a) preparing a dispersion which comprises an uncured epoxy resin as a continuous phase having dispersed therein an in situ polymerized insoluble acrylic elastomer which has a plurality of hydroxyl functionality, and (b) mixing together the dispersion and an effective amount of a rheological control agent which bears a plurality of pendent hydroxyl groups. Such a rheological control agent should be capable of rheological control without sag or stringing at relatively low, easy to pump, viscosity levels. Optionally, an epoxy resin curing agent may be added to the composition during the mixing together of the dispersion and the rheological control agent.

The method of using the adhesive composition comprises first applying the adhesive composition to a first surface; contacting the first surface having the adhesive composition applied thereto to a second surface in a bonding relationship with the adhesive composition disposed between the surfaces; and curing the adhesive composition. An epoxy resin cure accelerator can also be optionally used for rapid cure.

The invention requires a novel polymer-modified epoxy resin in which acrylic elastomer particles have added hydroxyl functionality. The main function of the acrylic elastomer is to improve toughness. Toughness of the epoxy resin is accomplished by selecting an optimum dispersed polymer phase and by balancing that with rheological control agents, thixotropes, fillers, curing agents, and other additives. Rheological control is achieved specifically by matching the hydroxyl groups of the rheological control agent with the hydroxyl functionality of the dispersed polymer phase of the epoxy resin. Hydroxyl functionality groups can be applied in different concentration levels, can be selected from a number of different chemical structures, preferably of acrylic or polyurethane composition, and can be grafted onto different moieties in the dispersed polymer phase.

The adhesive of the present invention has improved rheological control and adhesive performance while maintaining polymer properties such as low viscosities, high glass transition temperatures, toughness, and moisture resistance. The invention reduces the amount of thixotrope needed, extending the shelf life of common thixotropes giving reliable rheological properties, and reduces raw material costs.

At ambient and elevated temperatures adhesive systems engineered according to the invention show better rheological and sag control characteristics compared to adhesives prepared heretofore with liquid reactive resins, such as carboxyl-terminated butadiene-acrylonitrile liquid polymers, liquid epoxy resins and unmodified insoluble polymer dispersions in liquid epoxy resins.

Adhesives engineered according to the invention exhibit excellent sag control characteristics over at least several months at temperatures ranging from ambient temperature up to 450° F. The invention eliminates the use of additional diluents to incorporate large quantities of fumed silica for the purpose of sag control. Based on resin compositions without diluents, lower viscosities for ease of handling are possible. Glass transition temperatures are higher and moisture resistance is improved over known epoxy resin adhesives. Adhesives prepared according to the invention are also more economical since cheaper grades of fumed silica can be used instead of the more expensive grades. The present invention has also solved rheological control problems in paste-type toughened epoxy adhesives.

The invention has immediate use in adhesive and sealant applications, especially in structural adhesives. Other epoxy resin applications where rheological control is important include coatings, civil engineering applications, laminates, composites, reinforced plastics, and electrical encapsulations.

The present invention is also a stable dispersion of an organic polymer in an epoxy resin as a continuous phase, characterized in that the dispersion remains insoluble in the epoxy resin at a temperature of at least 60° C. The dispersed phase can be prepared by the polymerization of one or more monomers in a step reaction, in an addition reaction such as a cationic, anionic, or coordination polymerization, or free radical chain addition. Preferably, the dispersed phase is the polymerizate of an in situ polymerized ethylenically unsaturated functional monomer. It is also preferred that the dispersion contains a dispersion stabilizer. Preferably, the dispersion comprises an uncured epoxy resin as a continuous phase having dispersed therein an in situ polymerized insoluble acrylic elastomer which has a hydroxyl functionality and a dispersion stabilizer which has a moiety compatible with the epoxy resin and a moiety compatible with the in situ polymerized insoluble acrylic elastomer.

DETAILED DESCRIPTION OF THE INVENTION

In the present specification and claims, the term "epoxy resin" is employed to designate a compound or mixture containing, on an average, greater than one 1,2-epoxy group per molecule, which can be cross-linked into final form by means of a chemical reaction with a variety of curing agents used with or without heat. Typically the 1,2-epoxy group is a glycidyl residue:

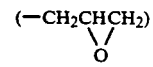

such as is found in glycidyl ethers, glycidyl esters or glycidyl amines. Examples of epoxy resins include diglycidyl ether of bisphenol A and tetraglycidylmethylenedianiline. In general, lower viscosity epoxy resins are used for paste adhesives. However, the materials can be diluted with reactive diluents, typically monofunctional, low viscosity epoxides. Preferably, the epoxy resin is a liquid epoxy resin at ambient temperature.

In the present invention, a polymer-modified epoxy resin is used. Preferably, a dispersion which comprises an uncured epoxy resin as a continuous phase having dispersed therein as a discontinuous phase an in situ polymerized insoluble acrylic elastomer which has a plurality of hydroxyl functionality is used.

In the present specification and claims, the term "in situ polymerized insoluble acrylic elastomer" is employed to designate a discontinuous particulate phase which is made by polymerizing or copolymerizing vinyl monomers in a continuous epoxy resin phase. The particulate phase can be prepared by the polymerization of one or more monomers in a step reaction (condensation), in an addition reaction such as a cationic, anionic, or coordination polymerization, or free radical chain addition.

The particulate phase is normally elastomeric if the glass transition temperature (Tg) is below room temperature. Typically, low glass transition temperatures, below room temperature, are obtained by including alkyl esters of acrylic or methacrylic acid as monomers. Generally, acrylic acid is used. Preferably, the alkyl group of such alkyl esters of acrylic or methacrylic acids contains at least 4 carbon atoms and more preferably 4 to 8 carbon atoms. Thus, butyl acrylate and 2-ethylhexyl acrylate are preferred.

The dispersed phase can be in an amount of from 5 to 70 weight percent, preferably 5 to 50 weight percent, most preferably 5 to 20 weight percent, of the total dispersion as long as the epoxy resin is the continuous phase. The optimum concentration of the polymeric dispersed phase can and will be varied depending upon the materials employed and the end-use that is envisaged. The dispersions are usually made at a solids level at which the dispersions are to be used. However, it is possible to prepare dispersions of higher solids level and dilute to the final solids level.

The dispersions are more easily prepared and have superior stability and other properties when a dispersion stabilizer is included in the composition. Essentially, the dispersion stabilizer can be any compound which contains at least two different moieties in its molecule, with at least one moiety compatible with the epoxy resin and at least one other moiety compatible with the in situ polymerized insoluble acrylic elastomer. The term "compatible" in reference to the moieties is meant to designate that a moiety is miscible or soluble in a phase of the dispersion. A preferred dispersion stabilizer is the polymerizate of at least one vinyl monomer and a vinylized epoxy resin adduct.

A process for preparing the dispersion described above is characterized by the steps of (1) providing a vinylized epoxy resin adduct by reacting a minor amount of functional monomer with a polyepoxide continuous phase, (2) providing a dispersion stabilizer by reacting the adduct with at least one vinyl monomer and (3) polymerizing said vinyl monomers in the polyepoxide continuous phase and in the presence of said dispersion stabilizer. Alternatively, steps (2) and (3) are performed at the same time. Also alternatively, the dispersion stabilizer is prepared separately and added to the polyepoxide before or during the addition and polymerization of the vinyl monomer.

The vinylized epoxy resin adduct is the reaction product of a functional monomer with an epoxy resin. Such a functional monomer has a reactive group in addition to a polymerizable double bond. Preferably, the vinylized adduct is made by reaction of a functional monomer which is reactive with an oxirane group of an epoxy resin. The reactive group may be, for example, the active hydrogen in a carboxylic acid, phenol, thiophenol, isocyanate, or an amine group. Such reactivity and methods for reacting the functional monomers with oxirane groups and the useful reaction parameters are known and judicious selection can be made by reference to the literature and simple preliminary experiment. Preferably, the functional monomer is an ethylenically unsaturated functional monomer. A preferred functional monomer is a substituted carboxylic acid. Preferably, the reaction product is an acrylic or methacrylic acid ester of the diglycidyl ether of bisphenol A.

In the present specification and claims, the term "adhesive" is employed to designate a formulation which is capable of bonding other substances together by surface attachment.

In the present specification and claims, the term "rheological control agent" is employed to designate a material which affects the deformation and flow of an adhesive in terms of stress, strain and time. Any acceptable level of rheological control agent may be used in the dispersion, but typically the rheological control agent is used in a level of up to 10 percent by weight of the total adhesive composition. An effective amount of a rheological control agent will be an amount necessary to achieve a desired level of deformation and flow of an adhesive and will generally be predetermined by the formulators of the adhesive. Such deformation and flow properties of an adhesive will generally be dictated by specific consumer or industrial need requirements and, as such, will vary from product to product.

Typical rheological control agents have included fumed silica, asbestos, carbon black, clays and chopped Kevlar fibers. Because of the carcinogenicity of asbestos, ineffectiveness of clays and the expense of Kevlar fibers, the most typical rheological control agents are fumed silicas such as those made by Cabot Corporation and sold under the trade name of CAB-O-SIL ™. In the present invention, hydrophilic fumed silica is preferred.

The special properties of hydrophilic fumed silica result from its unusual surface which is populated by hydrogen-bonded hydroxyl groups, pendant hydroxyl groups, and siloxane groups. The pendant hydroxyl groups contribute greatly to the unique behavior of hydrophilic fumed silica because they can bond to pendant hydroxyl groups on other hydrophilic fumed silica particles forming a temporary three-dimensional network of particles that will pervade a liquid system. The hydrogen bonding is easily broken under shear stress during mixing and the viscosity decreases. But these bonds reform and the viscosity increases again ("thixotropy"). See, for example, the Cabot Corporation's "CAB-O-SIL ™ Fumed Silica Properties and Functions" (1990) booklet.

In contrast, hydrophobic fumed silica is fumed silica which has been reacted with a compound to form a treated fumed silica. Typical compounds used to form treated fumed silicas include dimethyldichlorosilane and hexamethyldisilazane. Treatment with such compounds replaces many of the surface hydroxyl groups on the fumed silica with other groups, such as methyl groups. Any remaining surface hydroxyl groups typically become effectively shielded from interactions with other hydroxyl groups due to the added groups. See, for example, the Cabot Corporation's "CAB-O-SIL ™ TS-720 Treated Fumed Silica" (1990) booklet.

While the theory for how hydrophilic fumed silica works as a rheological control agent is simple, in practice the results are much more complicated because many of the formulation additives can interact with the hydrophilic fumed silica to reduce its effectiveness. Polyamide hardeners or monofunctional alcohols can reduce effectiveness severely. Other additives, such as diethylene glycol or glycerine, will increase the effectiveness.

In the present specification and claims, the term "hydroxyl functionality" is employed to designate the presence of the hydroxyl chemical group (—OH). This functionality can be introduced in the in situ polymerized insoluble acrylic elastomer by adding a hydroxyl functional vinyl comonomer such as hydroxyethyl acrylate, hydroxypropyl acrylate and methacrylate and hydroxybutyl acrylate and methacrylate. Almost any level of hydroxyl functional vinyl comonomer may be used so as to achieve a desired level of rheology control. Typically, however, low levels of hydroxyl functional vinyl comonomer should be used so as to achieve good rheology control but so as not to adversely affect other properties of the epoxy resin. As such, the hydroxyl functional vinyl comonomer can be in an amount of from 1 to 10 weight percent, most preferably 2 to 5 weight percent, of total monomer added to the epoxy resin.

In the present specification and claims, the term "thixotropes" is employed to designate materials which impart the ability of certain colloidal gels to liquify under stress. Examples include clays and the like.

In the present specification and claims, the term "fillers" is employed to designate inert materials which are used to provide a certain degree of stiffness and hardness and to decrease the cost of the product. Examples include calcium carbonate, silicates, soft clays, and the like. Any acceptable level of filler may be used in the adhesive composition, but typically the filler is used in a level of up to 50 percent by weight of the total adhesive composition.

In the present specification and claims, the term "curing" is employed to designate the conversion of a raw resin product to a finished and useful condition, usually by application of heat and/or chemicals which induce physico-chemical changes. The term "curing agent" is employed to designate active hydrogen-containing compounds such as amines, amides, mercaptans, acids, phenolics, alcohols, anhydrides, Lewis acids, and bases which are added to a formulation to aid in curing of the formulation. Dicyandiamide is a preferred curing agent. Any acceptable level of curing agent may be used in the adhesive composition, but typically the curing agent is used in a catalytic level up to a stoichiometric level based on the active hydrogen content of the adhesive composition, although a slight excess of curing agent may be used.

In the present specification and claims, the term "other additives" is employed to designate materials such as surfactants, antioxidants, stabilizers, colorants, inhibitors, and plasticizers which are added to a formulation as dictated by need requirements. Any acceptable level of other additives may be used in the adhesive composition, but typically the other additives are used in a level of up to 5 percent by weight of the total adhesive composition.

"Sagging" is defined as run or flow-off of adhesive from an adherent surface due to application of excess or low-viscosity material. A typical example of a sag test can be found in *General Motors Engineering Standards Bulletin*, "Sag Test For Structural Adhesives, GM9749P", available from General Motors Corporation.

The concept of the invention is illustrated in the following examples, which should not be construed as limitations upon the overall scope of the invention. In the examples, all parts and percentages are by weight unless otherwise specified.

EXAMPLE 1

Preparation of an Acrylic Elastomer-Modified Dispersion With Additional Hydroxy Functionality for Rheological Control A diglycidyl ether of bisphenol A having an epoxide equivalent weight of from 176 to 186 and a viscosity at 25° C. of between 9,000 and 11,500 cps and sold commercially by The Dow Chemical Company as D.E.R. TM 383 LER liquid epoxy resin (1,200 grams (g)), methacrylic acid (15 g), and catalyst (0.5 g, ethyltriphenyl phosphonium acetate-acetic acid complex, 70 percent solution in methanol), and hydroxyethyl methacrylate (HEMA) (15 g) are charged into a 3-liter, 3-necked, round-bottom flask which is equipped with a stirrer, addition funnel, condenser, thermocouple and nitrogen sparge. The resin is heated with stirring under an air atmosphere to 120° C. After an additional 60 minutes, analysis of the mixture of titration with standard base demonstrates that greater than 97 percent of the methacrylic acid has reacted with the epoxy resin to form a vinyl ester.

A mixture (monomer/initiator solution) of 2-ethylhexyl acrylate (291 g), glycidyl methacrylate (9 g), tert-butyl peroctoate (3 g), and tert-butyl perbenzoate (1.5 g) is added to the modified epoxy resin at 120° C. over approximately a 60 minute period. After addition of the monomer/initiator solution, the temperature was held at 120° C. for an additional three hours. Additional tert-butyl perbenzoate (0.6 g) is then added. The reactor temperature is raised to 140° C. and held for an additional two hours. The product is cooled and bottled.

The final product is a stable dispersion of acrylic elastomer in a liquid epoxy resin. The product has a hydroxyl functionality due to the hydroxyl groups bound to the insoluble acrylic rubber particles in the curable epoxy base resin. The product has a Brookfield viscosity (Model LVT, Spindle 4 at 6 rpm) of 84,000 cps at 25° C. and an epoxide equivalent weight of 240.

COMPARATIVE EXAMPLE A

Preparation of an Acrylic Elastomer-Modified Dispersion Without Additional Hydroxyl Functionality By way of comparison, an additional stable dispersion of vinyl polymer in an epoxy resin is prepared using techniques and materials similar to those described hereinbefore in Example 1, except that no hydroxyethyl methacrylate is added to the epoxy resin.

COMPARATIVE EXAMPLE B

As a further comparative, an unmodified sample of a diglycidyl ether of bisphenol A having an epoxide equivalent weight of from 176 to 186 and a viscosity at 25° C. of between 9,000 and 11,500 cps is used.

COMPARATIVE EXAMPLE C

As a further comparative, a diglycidyl ether of bisphenol A having an epoxide equivalent weight of from 172 to 176 and a viscosity at 25° C. of between 4,000 and 6,000 cps and sold commercially by The Dow Chemical Company as Tactix TM 123 epoxy resin is used.

Unmodified and elastomer-modified epoxy resins are blended with 4 parts fumed silica per 100 parts epoxy resin. The results for the formulations are shown in Table 1.

TABLE I

| Resin Description | Viscosity of Blended Formulation (cps at 25° C.) | Results Upon Blending Resin With Fumed Silica |
| --- | --- | --- |
| Example 1 | 84,000 | thick and not runny |
| Comparative Example A | 64,000 | thicker than unblended resin, but still runny |
| Comparative Example B | 10,000 | thicker than unblended resin, but slightly runny |
| Comparative Example C | 5,000 | thicker than unblended resin, but very runny |

The data in Table I illustrate the differences in viscosities and rheological control of modified and unmodified dispersions of epoxy resins. As can be seen, the lowest viscosities are obtained with the samples with unmodified liquid epoxy resins but rheological control is poor. Comparative Example A, modified without hydroxyethyl methacrylate, has a higher viscosity after being blended with fumed silica but still has poor rheological control. In contrast, Example 1, modified with hydroxyethyl methacrylate, has both a high viscosity and good rheological control.

EXAMPLE 2

Preparation of Adhesive Based on HEMA-Modified Liquid Epoxy Resin

The composition of Example 1 (375 g, HEMA-modified poly(2-ethylhexyl acrylate) elastomer in D.E.R. TM 383), calcium carbonate (100 g), and hydrophilic fumed silica (25 g) are mixed together in a Ross mixer. Dicyandiamide, CG-1200 grade (available from Air Products and Chemicals Company), is used as a curing agent at 95 percent of stoichiometric ratio and a p,p'-methylene bis(phenyldimethylurea) catalyst at 6 parts per hundred of catalyst to resin (phr) level is used to accelerate cure characteristics.

COMPARATIVE EXAMPLE D

Preparation of an Adhesive Based on Unmodified Liquid Epoxy Resin

D.E.R. TM 383 liquid epoxy resin (375 g), calcium carbonate (100 g), and hydrophilic fumed silica (25 g) are blended together. Dicyandiamide CG-1200 grade is used as a curing agent at 95 percent of stoichiometric ratio and a p,p'-methylene bis(phenyldimethylurea) catalyst at 6 phr level is used to accelerate cure characteristics.

A dynamic strain sweep measurement experiment was conducted at a constant rate of 1 radian per second on the adhesive compositions of Example 2 and Comparative Example D after respectively different storage times. Yield values were measured at ambient temperature using the Fluids Rheometer RF 7800 by Reometrics, Inc., Piscataway, N.J.

TABLE II

| Example No. | Date Measurement Taken* | Store Modulus, G' (Elastic Component) (dyne/square centimeter) | Loss Modulus, G" (Viscous Component) (dyne/square centimeter) |
| --- | --- | --- | --- |
| 2 | 1 | $1.202 \times 10^4$ | $3.346 \times 10^3$ |
|   | 2 | $1.193 \times 10^4$ | $3.421 \times 10^3$ |
| Comparative D | 1 | $2.767 \times 10^2$ | $1.504 \times 10^3$ |
|   | 2 | $1.909 \times 10^2$ | $1.333 \times 10^3$ |

*1: Measurement made 7 weeks after formulation of adhesive
2: Measurement made 10 weeks after formulation of adhesive The data in Table II show that the adhesive of Example 2 behaves more like a solid than a liquid (i.e., G' is significantly greater than G"). The adhesive of Example 2 has a high yield value (yield value is greater than $4.55 \times 10^3$ dyne/square centimeter) and has an easily pumpable viscosity (complex viscosity is $1.250 \times 10^4$ poise at 20° C.). In a horizontal sag test (where the adhesive beads are laid parallel to table-top and are placed vertically), at room temperature, thickest adhesive bead tested (0.30 inch depth) did not sag for at least 4.5 months. At 155° C. convection oven temperatures, 0.20 inch thick adhesive bead does not sag, and in less than 30 minutes cures maintaining its shape.

In comparison, the adhesive of Comparative Example D behaves more like a liquid than a solid (i.e., G' is significantly less than G"). The adhesive of Comparative Example D does not have a yield value and fails the sag test before the test is started both at room temperature and at 155° C.

COMPARATIVE EXAMPLE E

Preparation of Adhesive Based on Modified Liquid Epoxy Resin

The composition of Comparative Example A (375 g, poly(2-ethylhexyl acrylate) elastomer in D.E.R. TM 383), calcium carbonate (100 g), and hydrophilic fumed silica (25 g) are mixed together. Dicyandiamide, CG-1200 grade, is used as a curing agent at 95 percent of stoichiometric ratio and a p,p'-methylene bis(phenyldimethylurea) catalyst at 6 phr level is used to accelerate cure characteristics.

Sag test results for the Example 2 adhesive show excellent sag control at ambient and at 155° C. convection oven temperatures. Thickest adhesive bead tested (0.30 inch depth) does not sag at ambient temperature for at least 4.5 months and 0.20 inch adhesive bead does not sag at 155° C. In comparison, the adhesive of Comparative Example E after 30 minutes at ambient temperature, the thickest bead that did not sag was 0.15 inch. After 24 hours at ambient temperature, the thickest bead remaining for the Comparative Example E adhesive is 0.05 inch and the adhesive completely fails the 155° C. convection oven test.

COMPARATIVE EXAMPLE F

A one part adhesive, available from PPG Industries, Inc. as HC6227 Structural Epoxy Adhesive, is used as a further comparative.

COMPARATIVE EXAMPLE G

A one-part adhesive, available from American Cyanamid Company as Cybond TM 4551G Adhesive, is used as a further comparative. (Cybond is a trademark of the American Cyanamid Company.)

The adhesives of Example 2 and Comparative Examples D, E, F and G are subjected to tests to determine the lap shear strength, side impact strength, side impact strength failure mode, T-peel strength, and T-peel strength failure mode.

The results of several tests performed on the adhesives of Example 2 and Comparative Examples D, E, F and G are shown in Tables III–VIII. Unless otherwise noted, these tests were performed according to standard ASTM Test Methods.

TABLE III

| Adhesives (Example No.) | Sag Control Characteristics (at 155° C.) | Yield Values (dynes/square centimeter) | Complex Viscosities* at 22° C. (cps) |
|---|---|---|---|
| Example 2 | Excellent | >4.55 × 10³ | 1,240,000 |
| Comparative D | Did not pass sag test | No yield value | 135,000 |
| Comparative E | Did not pass sag test | No yield value | N/A |
| Comparative F | Excellent | 1.38 × 10³ | 1,470,000 |
| Comparative G | Excellent | <2.40 × 10³ | 1,500,000 |

*Samples that are runny and that do not have a yield value have complex viscosities that are very close to steady viscosities.

Yield values were measured at ambient temperature, at a rate of 1 radian/second using the Fluids Rheometer RF 7800 by Reometrics, Inc., Piscataway, N.J. The exact yield value of the Example 2 adhesive could not be measured because it exceeded the upper limit of the measuring capabilities of the instrument at 1 radian/second. Comparative Example G adhesive yield value measurement made at 0.5 radian/second gave 1.04 × 10³ dynes/square centimeter, and at 5.0 radian/second gave 2.40 × 10³ dynes/square centimeter. Since the yield value increases with increasing rate, at 1 radian/second it will be less than 2.40 × 10³ dynes/square centimeter but greater than 1.04 × 10³ dynes/square centimeter.

TABLE IV

Lap Shear Strength Data for Sample Adhesive Compositions

| Adhesive Composition | Cure Conditions Temperature (°C.) | Time (minutes) | Lap Shear Strength (pounds/sq. in. (psi)) |
|---|---|---|---|
| Example 2 | 155 | 20 | 4800 |
| Example 2 | 155 | 60 | 5300 |
| Comparative D | 155 | 30 | 3500 |
| Comparative F | 155 | 30 | 2500 |
| Comparative F | 155 | 60 | 4700 |
| Comparative F | 177 | 60 | 5400 |
| Comparative G | 177 | 30 | 3600 |
| Comparative G | 177 | 60 | 3900 |

Test Conditions: 63 mil cold-rolled steel (CRS) substrate, ground-to-ground, 0.5 weight percent 4 mil glass beads, 0.1 in/min crosshead speed; ASTM Test Method D-1002

TABLE V

Side Impact Data Strength for Sample Adhesive Compositions

| Adhesive Composition | Cure Conditions Temperature (°C.) | Time (minutes) | Side Impact Strength (in. lb) |
|---|---|---|---|
| Example 2 | 155 | 20 | 31 |
| Example 2 | 155 | 60 | 39 |
| Comparative D | 155 | 30 | 19 |
| Comparative F | 155 | 60 | 18 |
| Comparative G | 177 | 30 | 12 |
| Comparative G | 177 | 60 | 13 |

Test Conditions: Charpy Side Impact Strength on 63 mil CRS substrate, ground-to-ground, 0.5 weight percent 4 mil glass beads.

TABLE VI

Side Impact Strength Failure Mode Data for Sample Adhesive Compositions

| Adhesive Composition | Cure Conditions Temperature (°C.) | Length of Time (minutes) | Mode of Failure (Percent Cohesive)* |
|---|---|---|---|
| Example 2 | 155 | 20 | 100 |
| Example 2 | 155 | 60 | 100 |
| Comparative D | 155 | 30 | 17 |
| Comparative F | 155 | 60 | 100 |
| Comparative G | 177 | 30 | 100 |
| Comparative G | 177 | 60 | 100 |

*All failures were at the adhesive-substrate interface (thin-film cohesive), with the exception of Example 2.
Test Conditions: Charpy Side Impact Strength on 63 mil CRS substrate, ground-to-ground, 0.5 weight percent 4 mil glass beads.

TABLE VII

T-Peel Strength Data for Sample Adhesive Compositions

| Adhesive Composition | Cure Conditions Temperature (°C.) | Length of Time (minutes) | T-Peel Strength (pounds/linear inch (pli)) Peak Value | Plateau Value |
|---|---|---|---|---|
| Example 2 | 155 | 30 | 45 | 25 |
| Example 2 | 155 | 60 | 42 | 24 |
| Comparative D | 155 | 30 | 15 | 2 |
| Comparative F | 155 | 60 | 33 | 14 |
| Comparative G | 177 | 30 | 23 | 7 |
| Comparative G | 177 | 60 | 29 | 12 |

Test Conditions: 32 mil one-fourth hardness CRS, ground-to-ground, 0.5 weight percent 4 mil glass beads, 10.0 in/min crosshead speed; ASTM Test Method D-1876

TABLE VIII

T-Peel Strength Failure Mode for Sample Adhesive Compositions

| Adhesive Composition | Cure Conditions Temperature (°C.) | Length of Time (minutes) | Mode of Failure (Percent Cohesive) |
|---|---|---|---|
| Example 2 | 155 | 30 | 100 |
| Example 2 | 155 | 60 | 100 |
| Comparative D | 155 | 30 | 11 |
| Comparative F | 155 | 60 | 100* |
| Comparative G | 177 | 30 | 100 |
| Comparative G | 177 | 60 | 100 |

*Failure at the adhesive-substrate interface.
Test Conditions: 32 mil one-fourth hardness CRS, ground-to-ground, 0.5 weight percent 4 mil glass beads, 10.0 in/min crosshead speed

EXAMPLE 3

Preparation of an Acrylic Elastomer-Modified Dispersion with Hydroxyethyl Acrylate for Rheology Control A diglycidyl ether of bisphenol A having an epoxide equivalent weight of from 176 to 186 and a viscosity at 25° C. of between 9,000 and 11,500 cps and sold commercially by The Dow Chemical Company as D.E.R. TM 383 liquid epoxy resin (1,200 grams (g)), methacrylic acid (15 g), esterification catalyst (0.5 g, ethyltriphenyl phosphonium acetate-acetic acid complex, 70 percent solution in methanol), and hydroxyethyl acrylate (HEA, 15 g) are charged into a 3-liter, 3-necked, round-bottomed flask which is equipped with a stirrer, addition funnel, condenser, thermocouple and nitrogen sparge. The resin mixture is heated with stirring under an air atmosphere to 120° C. and held at that temperature for an additional 45 minutes. Under a nitrogen sparge, a mixture (monomer/initiator solution) of 2-ethylhexyl acrylate (291 g), glycidyl methacrylate (9 g), tert-butyl peroctoate (3 g) and tert-butyl perbenzoate (1.5 g) is added to the modified epoxy resin over approximately a 60-minute interval. The temperature is held at 120° C. for an additional 90 minutes after the addition of the monomer/initiator solution is complete. Then, more tert-butyl perbenzoate (0.6 g) is added. The reactor temperature is raised to 140° C. and held for an additional two hours. Finally, the product is cooled and bottled. The product has a Brookfield viscosity (Model HBTDV-II, spindle number 4 at 5 rpm) of 94,000 cps at 22.4° C. and an epoxide equivalent weight of 241.8.

The final product is a stable dispersion of 20 percent by weight acrylic elastomer in a liquid epoxy resin. The product has additional hydroxyl functionality bound to the acrylic polymer because of the presence of hydroxyethyl acrylate during the vinyl polymerization.

EXAMPLE 4

Preparation of an Acrylic Elastomer-Modified Dispersion with Hydroxypropyl Acrylate for Rheology Control A diglycidyl ether of bisphenol A having an epoxide equivalent weight of from 172 to 176 and a viscosity at 25° C. of between 4,000 and 6,000 cps and sold commercially by The Dow Chemical Company as TACTIX ™ 123 liquid epoxy resin (1,200 grams (g)), methacrylic acid (15 g), esterification catalyst (0.5 g, ethyltriphenyl phosphonium acetate-acetic acid complex, 70 percent solution in methanol), and hydroxypropyl acrylate (HPA, 15 g) are charged into a 3-liter, 3-necked, round-bottomed flask which is equipped with a stirrer, addition funnel, condenser, thermocouple and nitrogen sparge. The resin mixture is heated with stirring under an air atmosphere to 120° C. and held at that temperature an additional hour. Under a nitrogen sparge, a mixture (monomer/initiator solution) of 2-ethylhexyl acrylate (291 g), glycidyl methacrylate (9 g), tert-butyl peroctoate (3 g) and tert-butyl perbenzoate (1.5 g) is added to the modified epoxy resin at 120° C. over approximately a 60-minute period. The temperature is held at 120° C. for an additional 2 hours after the addition of the monomer/initiator solution is complete. Additional tert-butyl perbenzoate (0.6 g) is added and the reactor temperature is raised to 140° C. and held for an additional two hours.

Finally, the product is cooled and bottled. The product has a Brookfield viscosity (Model HBTDV-II, spindle number 4 at 5 rpm) of 48,400 cps at 21.6° C. and an epoxide equivalent weight of 230.3.

The final product is a stable dispersion of 20 percent by weight acrylic elastomer in a liquid epoxy resin. The product has additional hydroxyl functionality bound to the acrylic polymer because of the presence of hydroxypropyl acrylate during the vinyl polymerization.

EXAMPLE 5

Preparation of an Acrylic Elastomer-Modified Dispersion with Hydroxyethyl Methacrylate for Rheology Control A diglycidyl ether of bisphenol A having an epoxide equivalent weight of from 182 to 192 and a viscosity at 25° C. of between 11,000 and 14,000 cps and sold commercially by The Dow Chemical Company as D.E.R. ™ 331 liquid epoxy resin (900 g), methacrylic acid (11.25 g), esterification catalyst (0.5 g, ethyltriphenyl phosphonium acetate-acetic acid complex, 70 percent solution in methanol), and hydroxyethyl methacrylate (HEMA, 11.25 g) are charged into a 3-liter, 3-necked, round-bottomed flask which is equipped with a stirrer, addition funnel, condenser, thermocouple and nitrogen sparge. The resin mixture is heated with stirring under an air atmosphere to 120° C. and held for an additional hour. Under a nitrogen sparge, a mixture (monomer/initiator solution) of 2-ethylhexyl acrylate (564 g), glycidyl methacrylate (36 g), tert-butyl peroctoate (6 g) and tert-butyl perbenzoate (3 g) is added to the modified epoxy resin at 120° C. over approximately a 2-hour period. After addition of the monomer/initiator solution is complete, the temperature is held at 120° C. for an additional 2 hours. Additional tert-butyl perbenzoate (3 g) is added and the reactor temperature is raised to 140° C. and held for an additional hour. Finally, the product is cooled and bottled. The product has a Brookfield viscosity (Model HBTDV-II, spindle no. 6 at 10 rpm) of 411,000 cps at 21.2° C. and an epoxide equivalent weight of 302.7.

The product is a stable dispersion of 40 percent by weight acrylic elastomer in a liquid epoxy resin. The product has additional hydroxyl functionality bound to the acrylic polymer because of the presence of hydroxyethyl methacrylate during the vinyl polymerization.

COMPARATIVE EXAMPLE H

An Adhesive Formulation

Into a one-gallon stainless steel mixing bowl are added a 40 percent by weight poly(2-ethylhexyl acrylate-c-glycidyl methacrylate) modified dispersion in TACTIX ™ 123 liquid epoxy resin (which contains no hydroxyfunctional vinyl monomer in the vinyl copolymer and which is available from The Dow Chemical Company) (187.5 g), D.E.R. ™ 383 liquid epoxy resin (187.5 g) and calcium carbonate (100 g). The ingredients are mixed with a heavy duty mixer using a paddle-type mixing arm for 15 minutes. Then CAB-O-SIL ™ M-5 fumed silica (25 g) is added and mixed for an additional 15 minutes. Finally, dicyandiamide (18.75 g) and phenyldimethyl urea (7.5 g) are added and mixing is continued for an additional 15 minutes. The final adhesive has a Brookfield viscosity (Model HBTDV-II, spindle number 7, 20 rpm) of 492,000 cps at 22.8° C.

Sag Resistance

The sag resistance of a particular adhesive formulation is measured using General Motors test procedure GM 9749 P. The paste adhesive is extruded through an aluminum die with semi-circular openings of 3/16 inch, 5/16 inch and ½ inch diameter onto coating panels. The movement of the adhesive beads is observed with the panels oriented perpendicular to level (90° angle) and the beads parallel to the supporting surface. The beads are observed for 5 minutes at room temperature followed by 5 minutes at 177° C. (350° F.). Failure was considered to be any perceptible slippage of the adhesive bead down the panel.

The sag resistance of Comparative Example H passes 3/16 inch bead diameter at room temperature but fails at 5/16 inch and ½ inch bead diameters at room temperature and fails all bead diameters at elevated temperatures.

Adhesive Performance

The tested adhesive is applied to 1 inch×4 inches×32 mil hot-dipped galvanized steel and cold-rolled steel coupons. Coupons are cleaned with isopropanol and a thin coating of cutting oil is applied to the coupon surface. The coupon overlap was ½ inch and a glue line thickness of 5 mil is controlled by adding 5 mil spacer glass beads. Tensile lap shear strengths are measured on a United Testing Machine equipped with a 5,000 lb load cell. The test method is SAE J1523. The crosshead speed is 0.5 in/min.

The tensile lap shear strength for Comparative Example H is 2,310 psi on the cold-rolled steel coupons and 2,490 psi on the hot-dipped galvanized steel coupons.

EXAMPLE 6

Adhesive Formulation

The dispersion from Example 3 (375 g) and calcium carbonate (100 g) are added into a one-gallon stainless steel mixing bowl. The ingredients are mixed with a heavy duty mixer using a paddle-type mixing arm for 15 minutes. Then CAB-O-SIL TM M-5 fumed silica (25 g) is added and mixed for an additional 15 minutes. Finally, dicyandiamide (18.75 g) and phenyldimethyl urea (7.5 g) are added and mixing is continued for an additional 15 minutes. The final adhesive has a Brookfield viscosity (Model HBTDV-II, spindle number 7, 20 rpm) of 925,000 cps at 20.4° C.

The sag resistance of this adhesive passes 3/16 inch, 5/16 inch and ½ inch bead diameters at room temperature. At elevated temperature, the adhesive passes 3/16 inch bead diameter. The results are visually and quantitatively better than those for Comparative Example H.

The tensile lap shear strength for the adhesive is 2,400 psi on the cold-rolled steel coupons and 2,460 psi on the hot-dipped galvanized steel coupons.

EXAMPLE 7

Adhesive Formulation

In the same manner as Example 6, the dispersion from Example 4 (375 g) and calcium carbonate (100 g) are added into a one-gallon stainless steel mixing bowl. The ingredients are mixed with a heavy duty mixer using a paddle-type mixing arm for 15 minutes. Then CAB-O-SIL TM M-5 fumed silica (25 g) is added and mixed for an additional 15 minutes. Finally, dicyandiamide (18.75 g) and phenyldimethyl urea (7.5 g) are added and mixing is continued for an additional 15 minutes. The final adhesive has a Brookfield viscosity (Model HBTDV-II, spindle number 7, 20 rpm) of 452,000 cps at 21.6° C.

The sag resistance of the adhesive passes 3/16 inch, 5/16 inch and ½ inch bead diameters at room temperature. At elevated temperature, the adhesive passes 3/16 inch bead diameter. The results are visually and quantitatively better than those for Comparative Example H.

The tensile lap shear strength for the adhesive is 2,240 psi on the cold-rolled steel coupons and 2,320 psi on the hot-dipped galvanized steel coupons.

EXAMPLE 8

Adhesive Formulation

The dispersion from Example 5 (187.5 g), D.E.R. TM 383 liquid epoxy resin (187.5 g) and calcium carbonate (100 g) are added into a one-gallon stainless steel mixing bowl. The ingredients are mixed with a heavy duty mixer using a paddle-type mixing arm for 15 minutes. Then CAB-O-SIL TM M-5 fumed silica (25 g) is added and mixed for 15 minutes. Finally, dicyandiamide (18.75 g) and phenyldimethyl urea (7.5 g) are added and mixing is continued for an additional 15 minutes. The final adhesive has a Brookfield viscosity (Model HBTDV-II, spindle number 7, 20 rpm) of 625,000 cps at 22.5° C.

The sag resistance of the adhesive passes 3/16 inch, 5/16 inch and ½ inch bead diameters at room temperature and at elevated temperature. The results are visually and quantitatively better than those for Comparative Example H.

The tensile lap shear strength for the adhesive is 2,160 psi on the cold-rolled steel coupons and 2,360 psi on the hot-dipped galvanized steel coupons.

EXAMPLE 9

Adhesive Formulation

The dispersion from Example 5 (187.5 g), TACTIX TM 123 liquid epoxy resin (187.5 g) and calcium carbonate (100 g) are added into a one-gallon stainless steel mixing bowl. The ingredients are mixed with a heavy duty mixer using a paddle-type mixing arm for 15 minutes. Then CAB-O-SIL TM M-5 fumed silica (25 g) is added and mixed for 15 minutes. Finally, dicyandiamide (18.75 g) and phenyldimethyl urea (7.5 g) are added and mixing is continued for an additional 15 minutes. The final adhesive has a Brookfield viscosity (Model HBTDV-II, spindle number 7, 20 rpm) of 420,000 cps at 23.6° C.

The sag resistance of the adhesive passes 3/16 inch, 5/16 inch and ½ inch bead diameters at room temperature and at elevated temperature. The results are visually and quantitatively better than those for Comparative Example H.

The tensile lap shear strength for the adhesive is 2,210 psi on the cold-rolled steel coupons and 2,350 psi on the hot-dipped galvanized steel coupons.

What is claimed is:

1. A thixotropic adhesive composition exhibiting good sag resistance comprising a mixture of:
   a. a dispersion which comprises an uncured epoxy resin as a continuous phase having dispersed therein an in situ polymerized insoluble acrylic elastomer which has a plurality of hydroxyl functionality; and
   b. an effective amount of a rheological control agent which has a plurality of pendent hydroxyl groups.

2. The adhesive composition of claim 1 wherein the dispersion further comprises a dispersion stabilizer which has a moiety compatible with the epoxy resin and a moiety compatible with the in situ polymerized insoluble acrylic elastomer.

3. The adhesive composition of claim 1 wherein said rheological control agent is hydrophilic fumed silica.

4. The adhesive composition of claim 1 wherein said epoxy resin is a diglycidyl ether of bisphenol A.

5. The adhesive composition of claim 1 wherein said in situ polymerized insoluble acrylic elastomer is hydroxyethyl methacrylate.

6. A process for preparing the adhesive composition of claim 1 comprising:
   a. preparing a dispersion which comprises an uncured epoxy resin as a continuous phase having dispersed therein an in situ polymerized insoluble acrylic elastomer which has a plurality of hydroxyl functionality, and
   b. mixing together the dispersion and an effective amount of a rheological control agent which has a plurality of pendent hydroxyl groups.

7. The process of claim 6 further comprising the addition of an epoxy resin curing agent to the mixing together of the dispersion and the rheological control agent.

8. The process of claim 7 wherein said epoxy resin is a diglycidyl ether of bisphenol A.

9. The process of claim 8 wherein said in situ polymerized insoluble acrylic elastomer is derived from hydroxyethyl methacrylate.

10. The process of claim 9 wherein said epoxy resin curing agent is dicyandiamide.

11. The process of claim 10 wherein said rheological control agent is hydrophilic fumed silica.

12. A method for using the adhesive composition of claim 1 comprising:
   a. applying the adhesive composition to a first surface;
   b. contacting the first surface having the adhesive composition applied thereto with a second surface in a bonding relationship with the adhesive composition disposed between the surfaces; and
   c. curing the adhesive composition.

* * * * *

UNITED STATES PATENT AND TRADEMARK OFFICE
CERTIFICATE OF CORRECTION

PATENT NO. : 5,204,386
DATED : April 20, 1993
INVENTOR(S) : Yasemin Ersun-Hallsby; Dwight K. Hoffman; and Gene D. Rose, all of Midland, Mich.

It is certified that error appears in the above-indentified patent and that said Letters Patent is hereby corrected as shown below:

On the title page: Item [75] Inventors, delete "Gerald C. Kolb, Bay City";.

Signed and Sealed this

First Day of March, 1994

*Attest:*

BRUCE LEHMAN

*Attesting Officer*     *Commissioner of Patents and Trademarks*